Patented Sept. 23, 1952

2,611,738

UNITED STATES PATENT OFFICE 2,611,738

HYDROCARBON CONVERSION CATALYST AND PROCESS

Glenn M. Webb, Western Springs, and Reno W. Moehl, Congress Park, Ill., assignors to Universal Oil Products Company, Chicago, Ill., a corporation of Delaware No Drawing. Application July 25, 1947, Serial No. 763,737

9 Claims. (Cl. 196—52)

This invention relates to the improvements in the manufacturing of catalytic composites of silica and metal oxides, and to the use of these improved catalysts in effecting hydrocarbon conversion reactions.

Catalytic composites of silica and metal oxides as, for example, silica-alumina, silica-magnesia, silica-alumina-magnesia, silica-zirconia, silica-alumina-zirconia, silica-thoria, silica-alumina-thoria, etc., are particularly suitable for effecting various hydrocarbon conversion reactions.

These catalysts are especially desirable for use in the cracking of higher boiling oils to produce gasoline, including large amounts of olefinic gases which may be polymerized or otherwise utilized. The cracking reaction is generally effected at temperatures within the range of from about 800° to about 1100° F. and at moderately superatmospheric pressures which generally are below about 50 pounds per square inch.

These catalysts may also find particular utility in other hydrocarbon conversion reactions including (1) treatment of gasoline to improve its antiknock properties, in the well known processes commonly referred to in the art as reforming, isoforming, retreating, etc., (2) alkyl transfer reactions as, for example, the reaction of xylene with benzene to form toluene, etc., (3) refining of hydrocarbons and particularly gasoline to remove undesirable impurities such as sulfur, etc., (4) alkylation of aromatic or isoparaffinic hydrocarbons with olefinic hydrocarbons, alcohols, esters, etc., (5) polymerization of unsaturated hydrocarbons to form higher boiling products, etc. In addition these catalysts may find particular utility in the treatment of other organic materials as, for example, the dehydration of alcohols to form hydrocarbons, etc. The temperature and pressure to be employed in the process will depend upon the particular reaction to be effected.

Satisfactory silica-metal oxide catalysts may be prepared by various methods involving separate precipitation, successive precipitation, coprecipitation, commingling of silica hydrogel with slurries of the metal oxide or metal hydroxide, etc. In conventional preparations the catalyst composite is usually finally washed, dried and calcined.

Recent investigations have shown that the amount of hydrocarbonaceous deposit, commonly referred to as coke, formed during the conversion of hydrocarbons at high temperatures is generally lower when the catalyst employed is of a lower density. One method of lowering the density of the catalyst is to subject the catalyst to treatment with steam or hot water. In the interest of simplicity this treatment is herein referred to as hot aging as it involves treatment at elevated temperatures for a definite period of time. However, it has been found that in a number of instances, this treatment did not give the expected reduction in coke formation, and the present invention is directed to an improvement in the hot aging of catalysts.

Another serious problem involved in the manufacture of certain silica-metal oxide catalysts is the difficulty encountered in filtering the catalyst to separate the solid product from water or other liquids employed in the washing or other treatment of the catalyst. This is particularly true of catalysts prepared by commingling silica hydrogel with metal oxides to form particles of uniform size and shape and particularly spherical particles. It is believed that the filtering difficulty is due to the large amount of fines formed during the manufacture of the catalyst, apparently these fines tend to plug the holes in the filtering screen and thereby interfere with satisfactory performance of the filter apparatus. In addition, the presence of large amounts of fines in the catalyst is objectionable for various reasons. For example, in the moving catalyst type process, the catalyst fines are lost from the system, in a manner to be hereinafter set forth. In the fixed bed type of process, the presence of large amounts of fines is objectionable because of the increased pressure drop through the catalyst bed caused by the fines. There are of course other objections from a processing viewpoint to the presence of large amounts of fines in the catalyst. As another important advantage to the present invention, it has been found that the novel features thereof will reduce the amount of fines formed during manufacture of catalysts and thereby will not only facilitate the ready filtering of the catalyst but will also improve plant operations by reducing catalyst losses, reducing pressure drop through the catalyst bed, etc.

In one embodiment the present invention relates to an improvement in the manufacture of silica-metal oxide catalysts which comprises compositing silica with a metal oxide and, prior to substantial drying, subjecting the composite at an elevated temperature to the action of an ammonium salt solution having a pH below about 9.

In a specific embodiment the present invention relates to a method of manufacturing a silica-magnesia catalyst which comprises commingling an acid with an alkali metal silicate and dispersing the mixture in the form of droplets into a suspending medium under conditions to form firm silica hydrogel spheres, compositing said spheres with magnesia, treating the composite to remove alkali metals, subjecting the composite to hot aging with an ammonium salt solution having a pH below about 9, and subsequently washing and drying the catalyst.

As hereinbefore set forth the silica-metal oxide catalyst may be prepared in any suitable manner. In general, best catalysts are produced by forming silica hydrogel and subsequently compositing the metal oxide or metal oxides therewith. The silica hydrogel is conveniently prepared by reacting an alkali metal silicate and particularly commercial water glass with an acid such as hydrochloric acid, sulfuric acid, etc., under conditions to precipitate silica hydrogel. In general the amounts of water glass and acid are controlled to form a mixture having a pH within the range of from about 6 to about 8, which conditions will form silica hydrogel within a reasonable setting time. Silica hydrogel spheres are readily prepared by dispersing droplets of a mixture of acid and water glass at a pH within this range through a nozzle or from a rotating disk into a bath of oil or other water-immiscible suspending medium. Usually a layer of water is disposed beneath the oil bath and the water serves as a means of transporting the silica spheres from the forming zone. According to the present invention it is necessary to treat the silica spheres in order to remove alkali metals introduced through the use of the water glass. The alkali metals are readily removed by washing the silica spheres with dilute acid solutions or by the use of ammonium compounds which serve to replace the alkali metal ions with ammonium ions. When desired the silica spheres may then be washed with water.

Silica spheres formed in the above manner may be composited with another metal oxide in several methods. In one method, a suitable salt of the metal oxide as, for example, aluminum sulfate, aluminum chloride, magnesium sulfate, magnesium chloride, zirconium sulfate, zirconium chloride, zirconium oxychloride, thorium sulfate, thorium chloride, etc., is commingled with the silica spheres and the corresponding oxide precipitated by the addition of a suitable agent such as ammonium hydroxide, etc.

Another method of compositing the metal oxide with the silica spheres, is to commingle a slurry of the metal oxide as, for example, aluminum oxide, magnesium oxide, zirconium oxide, etc., with the silica spheres and stir the mass to insure intimate mixing of the oxides. The metal oxides may comprise naturally occurring materials or may be formed by separate precipitation by well known methods. In still another method of preparation, silica hydrogel-metal oxide catalysts may be formed by co-precipitation, in which method a suitable salt of the metal oxide or oxides is commingled with the water glass, and an acid or base, as required, is then added to precipitate the corresponding oxides.

Silica-metal oxide catalyst formed in any suitable manner, with or without prior water washing, is now subjected to a specific hot aging treatment in accordance with the present invention. It is essential that the hot aging treatment be employed before the catalyst is subjected to substantial drying. Although the invention is not limited to the following explanation, it is believed that the internal structure of the catalyst is set during the drying and calcination treatments. The improvements obtained in the present invention are believed to be due to the controlled distribution and size of pores within the catalyst structure which are obtained by hot aging in the presence of the selected ammonium salt solution. It is therefore essential that the hot aging treatment be applied to the catalyst before the internal structure thereof is established.

In accordance with the invention, the catalyst is subjected to hot aging in the presence of an ammonium salt solution having a pH below about 9. Any suitable ammonium salt solution having a pH below about 9 may be employed within the scope of the present invention. Particularly preferred ammonium salt solutions include those of ammonium carbonate, ammonium bicarbonate and ammonium acetate. Other satisfactory but not necessarily equivalent ammonium salt solutions include those of ammonium carbamate, ammonium nitrate, ammonium nitrite, ammonium sulfate, ammonium chloride, ammonium bromide, ammonium iodide, ammonium fluoride, ammonium formate, ammonium propionate, ammonium butyrate, ammonium valerate, ammonium lactate, ammonium malonate, ammonium oxalate, ammonium palmitate, ammonium benzoate, etc., as well as alkyl and aryl substituted ammonium compounds. It is understood that the above ammonium salts are merely representative and that other suitable ammonium salt solutions having a pH below about 9 may be employed within the broad scope of the present invention.

The hot aging treatment may be effected in any suitable manner. A particularly preferred method is to subject the catalyst to hot digestion treatment by suspending the catalyst in the ammonium salt solution and maintaining the solution at the desired elevated temperature. In general this will be accomplished in open top tanks and the temperature employed will range from about 100° F. to the boiling point of the solution which, in general, will be from 212° F. to about 250° F. In such an operation the pressure will be substantially atmospheric. However, higher temperatures and pressures may be employed when desired, and this may conveniently be accomplished by effecting the treatment in closed tanks constructed to withstand the higher temperatures and pressures. The time of hot aging will generally vary from about 1 hour to about 16 hours or more.

After the catalyst has been subjected to the hot aging treatment, it may be washed with water or water solutions of ammonium carbonate or other basic reagent. With certain metal oxides as, for example, magnesia the use of an acidic wash solution is undesirable because the acid tends to dissolve and thereby remove some of the magnesia. The catalyst is then dried at a temperature of from about 200° to about 500° F. and, when desired, the catalyst may be calcined at a temperature of from about 900° to about 1200° F., for about 1 to 10 hours or more.

The improved catalysts of the present invention may be employed for effecting hydrocarbon conversion reactions in any suitable plant equipment, either of the fixed bed or moving catalyst bed type. In the fixed bed process the catalyst is deposited in one or more reaction zones, and the hydrocarbon to be converted is passed therethrough at the desired temperature, pressure and time of contact. The moving bed type of process includes (1) the fluidized type process in which the hydrocarbon to be converted or other suitable carrying medium is utilized to transport the catalyst into the reaction zone, wherein the reactants and catalysts are maintained in a state of turbulence under hindered settling conditions and wherefrom the catalyst is transferred by means of an oxygen-containing gas or other suitable medium into a regeneration zone wherein hydrocarbonaceous deposits are removed from the catalyst, (2) the moving catalyst bed type process in which the hydrocarbon to be converted is passed either concurrently or countercurrently to a moving bed of catalyst, (3) the suspensoid type process in which the catalyst is carried as a slurry in the hydrocarbon to be converted into the reaction zone, etc.

As hereinbefore set forth spherical catalysts are particularly preferred for use in the moving catalyst type process because the catalyst does not contain any sharp edges which tend to break off and thereby cause fines which are lost in the exhaust gases and also because the spheres do not cause equipment erosion to the large extent caused by particles containing sharp edges. A particularly satisfactory moving catalyst type process is the fluidized process. In the fluidized process the catalyst is carried into the reaction zone by the hydrocarbon oil to be cracked or by other suitable media and, after it has served to effect the cracking reaction, the catalyst is transported by air or other oxygen-containing gas into a regeneration zone, wherein hydrocarbonaceous deposits are burned from the catalyst and wherein the regenerated catalyst is separated from the combustion gases. A major proportion of the catalyst loss occurs by the catalyst fines being carried out of the system with the vented combustion gases. These losses are excessive when the catalyst contains a large amount of fines. It is thus seen that catalysts prepared by the present invention, which are low in fines and which are strong in physical characteristics, will result in lower catalyst losses.

In addition to reducing catalyst loss and improving plant operation, the reduction in the amount of fines in the finished catalyst is extremely important during the washing-filtration steps of manufacturing the catalyst. It has been found that catalyst containing large amount of fines can not readily be filtered due to the fines plugging the filtering screen. In one case a silica-magnesia catalyst was prepared by conventional methods and attempts to filter the catalyst in a Buchner funnel required a period of over 5 hours and even then good filtering was not accomplished. On the other hand, a catalyst similarly prepared but aged in accordance with the teachings of the present invention was readily filtered in a Buchner funnel in a matter of a few minutes. Similar difficulties have been encountered in attempts to manufacture this catalyst on a commercial scale. For example in the expanded bed type washer, the wash water is decanted, and it has been found that large catalyst losses occur because of the catalyst fines being carried away in the wash water.

The following examples are introduced to illustrate further the novelty and utility of the present invention but not with the intention of unduly limiting the same.

Silica-magnesia catalysts may be prepared by forming silica spheres and then compositing magnesia therewith. The silica spheres are prepared by admixing acid and water glass at a pH of about 7 and dispersing droplets thereof from a rotating disk into an oil bath. The silica spheres are transferred from the forming zone and then are treated to remove alkali metal ions. The spheres are then suspended in a solution of magnesium sulfate, and magnesia is precipitated by the addition of ammonium hydroxide. The catalyst composite is washed with water and then subjected to digestion at a temperature of 180° F. for 4 hours in an aqueous ammonium carbonate solution containing 10 grams of ammonium carbonate per 400 grams of catalyst. The catalyst is then dried at 300° F. for 8 hours and calcined at 1100° F. for 2 hours.

Another batch of catalyst may be prepared in a similar manner but omitting the hot digestion treatment. It will be found that the catalyst prepared without the hot aging treatment will contain a large amount of fines, whereas the catalyst prepared with the hot aging treatment in the presence of the buffer solution will be relatively low in fines.

We claim as our invention:

1. An improvement in the manufacture of silica-metal oxide catalyst which comprises compositing silica hydrogel with a metal oxide and, prior to substantial drying, aging the composite of silica hydrogel and metal oxide at an elevated temperature and for a period of at least an hour in an ammonium salt solution having a pH below about 9.

2. The process of claim 1 further characterized in that the aging of said composite in the ammonium salt solution is effected at a temperature of from about 100° to about 250° F.

3. The method of claim 1 further characterized in that said ammonium salt comprises an ammonium carbonate.

4. The method of claim 1 further characterized in that said ammonium salt comprises an ammonium bicarbonate.

5. The method of claim 1 further characterized in that said ammonium salt comprises an ammonium acetate.

6. The process of claim 1 further characterized in that said metal oxide comprises alumina.

7. The process of claim 1 further characterized in that said metal oxide comprises magnesia.

8. The process of claim 1 further characterized in that said metal oxide comprises zirconia.

9. A process for the conversion of a hydrocarbon which comprises subjecting said hydrocarbon at conversion conditions to contact with a catalyst prepared by compositing silica hydrogel with a metal oxide and, prior to substantial drying, aging the composite of silica hydrogel and metal oxide at an elevated temperature and for a period of at least an hour in an ammonium salt solution having a pH below about 9.

GLENN M. WEBB.
RENO W. MOEHL.

REFERENCES CITED

The following references are of record in the file of this patent:

UNITED STATES PATENTS

| Number | Name | Date |
|---|---|---|
| 2,300,106 | Connolly | Oct. 27, 1942 |
| 2,378,530 | Bailie et al. | June 19, 1945 |
| 2,384,943 | Marisic | Sept. 18, 1945 |
| 2,387,596 | Marisic | Oct. 23, 1945 |
| 2,405,408 | Connolly | Aug. 6, 1946 |
| 2,412,868 | Brown | Dec. 17, 1946 |
| 2,429,981 | Bates | Nov. 4, 1947 |
| 2,462,236 | Thomas | Feb. 22, 1949 |
| 2,484,258 | Webb et al. | Oct. 11, 1949 |

FOREIGN PATENTS

| Number | Country | Date |
|---|---|---|
| 525,981 | Great Britain | Sept. 9, 1940 |